(12) United States Patent
Brisco et al.

(10) Patent No.: US 6,283,153 B1
(45) Date of Patent: Sep. 4, 2001

(54) FLOW VALVE

(75) Inventors: Harlin J. Brisco, Questo; Victor Duran, Santa Fe; William Mitchell, Moriasty, all of NM (US)

(73) Assignee: The Better Way Company, LLC, Sante Fe, NM (US)

( * ) Notice: Subject to any disclaimer, the term of this patent is extended or adjusted under 35 U.S.C. 154(b) by 0 days.

(21) Appl. No.: 09/346,496

(22) Filed: Jun. 30, 1999

Related U.S. Application Data

(60) Provisional application No. 60/100,334, filed on Sep. 15, 1998.

(51) Int. Cl.[7] ............................................... F16K 11/10
(52) U.S. Cl. ................................. 137/625.47; 73/201
(58) Field of Search ........................ 73/201; 137/625.47

(56) References Cited

U.S. PATENT DOCUMENTS

| | | |
|---|---|---|
| 3,122,158 | 2/1964 | Grunsky . |
| 3,148,690 | 9/1964 | Peterson . |
| 3,173,295 | 3/1965 | Magleby . |
| 3,187,570 * | 6/1965 | Mueller ................................. 73/201 |
| 3,238,969 * | 3/1966 | Champion ............................. 73/201 |
| 3,382,888 * | 5/1968 | Mueller et al. ....................... 73/201 |
| 3,754,573 | 8/1973 | Bales . |
| 3,946,754 | 3/1976 | Cook . |
| 4,327,760 | 5/1982 | Lancaster . |
| 5,482,073 | 1/1996 | Winnie et al. . |

* cited by examiner

*Primary Examiner*—John Fox
(74) *Attorney, Agent, or Firm*—Deborah A. Peacock; Andrea L. Mays; Paul Adams

(57) ABSTRACT

A method and apparatus for conducting and directing the flow of fluid. A movable core within the flow valve has openings which can be aligned or misaligned with an inlet, outlet, and bypass tap hole on the flow valve body thereby either blocking the flow of fluid, allowing the flow of fluid directly through the valve, allowing the fluid to flow directly through the valve as well as to the bypass tap hole, or only allowing the flow of fluid to the bypass tap hole.

9 Claims, 6 Drawing Sheets

FLOW VALVE

CROSS-REFERENCE TO RELATED APPLICATIONS

This application claims the benefit of the filing of U.S. Provisional Patent Application Ser. No. 60/100,334, entitled Gas Flow Valve, filed on Sep. 15, 1998, and the specification thereof is incorporated herein by reference.

BACKGROUND OF THE INVENTION

1. Field of the Invention (Technical Field)

The present invention relates to fluid service devices and the bypass of measuring or meter portions within.

2. Background Art

In the natural gas service business, for both residential and commercial customers, each customer is provided with a service stop to control the flow of gas and thus service to the customer. These stops are provided on all gas supply risers generally on the supply side of an individual or multiple header meter station. A supply pipe provides gas to the stop, which when opened, supplies gas to the meter from which the metered supply of gas passes to the customer through a pipe. In typical service, it may be necessary for the utility company to change out the meter and/or regulator, generally referred to as the "meter loop" to permit repairs. In order not to discontinue service to the customer during such repair, it is desirable to provide some bypass between the supply pipe and customer connection.

Unless this bypass is provided, it is necessary to have access to the customer's premises in order to re-light the pilots in any gas appliances, such as a hot water heater, and to check the customer's equipment. If the customer is not at home at that time, it requires a return to the premises. The utility companies have recognized that return calls for the purpose of providing re-lighting of gas appliances and to check customer equipment is very expensive. There is also a potential exposure to liability of the public service company for operation of the appliances after gas service has been interrupted unless there has been checking of the customer's equipment. It is therefore desirable to provide some sort of bypass that may be used by utility company repair personnel.

To perform this operation with the use of current stop valves, the customer line is provided with a tapped hole. The repairperson is provided with a propane or compressed natural gas bottle together with a flexible hose having an in-line regulator and terminating in a male tapped connector. The gas bottle is connected to the flexible hose and has an in-line regulator which terminates in a connector that is engaged in an opening in the customer line. Typically, the opening has a check valve to which the connector of the portable external supply is connected. In operation, the gas stop valve is shut off while simultaneously the gas bottle is opened so that the pressure upstream of the check valve exceeds the customer pipe gas pressure commencing the flow of gas from the bottle to the customer. When the gas stop valve is fully shut off, the repairperson then has access to the meter to perform repair operations.

One difficulty with this procedure is that it requires the repairperson to carry the portable gas supply. Each repairperson must be equipped with a gas bottle, regulator, and flexible hose so that all repairpersons can perform the bypass operation. This increases the cost of equipping repairpersons. It also increases the time to complete the bypass. If the bottle is depleted before the repair is completed, service must be restored (where it is possible to do, i.e., the meter loop can be reassembled), a new bottle must be obtained, the bypass effected again—all resulting in expense and waste of time.

Other patents have attempted to address this issue and disclose devices dissimilar to the present invention. U.S. Pat. No. 5,482,073 to Winnie et al., entitled "Method of Changing Out Gas Meters" requires the use of an auxiliary source of gas as discussed above. U.S. Pat. No. 3,148,690 to Peterson, entitled "Method and Apparatus for Changing Gas Meters" also requires an auxiliary source. U.S. Pat. No. 3,122,158 to Grunsky, entitled "Gas Meter Changing Device" requires a flexible bag which can only withstand a certain degree of pressure. U.S. Pat. No. 4,327,760 to Lancaster, entitled "Non-Interrupting Gas Meter Exchange System" requires a rigid frame and isolating enclosure to provide fluid bypass. U.S. Pat. No. 3,946,754 to Cook, entitled "Gas Meter Disconnect Service" also requires an alternate supply of gas. U.S. Pat. No. 3,754,573 to Boles, entitled "Multipurpose Gas Meter Change Valve" is a complex configuration of ball valves used to bypass gas flow. U.S. Pat. No. 3,173,295 to Magleby, entitled "Fluid By-Pass Device" also discloses a complex configuration to perform bypass using springs, cages, and discs to direct fluid flow.

The present invention overcomes the difficulties described above, particularly the necessity of supplying each repairperson with an auxiliary supply of gas to use during the bypass operation.

SUMMARY OF THE INVENTION (DISCLOSURE OF THE INVENTION

The flow valve of the present invention provides a CLOSED position for completely stopping the flow of gas; an OPEN position for allowing gas to flow as normal through the meter loop and to the customer; a BEGIN BYPASS position to route the flow of gas to both the meter loop and to a bypass loop; and a FULL BYPASS position to route the flow of gas to the bypass loop avoiding the meter loop yet still supplying gas to the customer. This valve is installed permanently onto the gas line and eliminates all the aforementioned problems.

The present invention is a valve and method for directing the flow of fluid comprising a valve body having at least one inlet, at least one outlet, and a bypass tap hole; a core between the at least one inlet and outlet having a solid portion, a passage, and a plurality of openings. The core is movable to align at least one of the plurality of openings with at least one of the inlet, outlet, and bypass tap hole to direct the flow of fluid. The valve body preferably has an ear having an ear hole and the core preferably has an ear having an ear hole. These ears can be aligned and locked via the holes. The core ear preferably has a grasping tab for turning the core. Fluid can be conducted through the core and hence the valve because the core has a passage through it. The core has a plurality of through openings aid a bypass flow opening for directing the flow of fluid through the core. Preferably there is a first and a second through opening. The bypass flow opening is disposed opposite the second through opening on the core, and the first through opening is intermediate to the second through opening and bypass flow opening. The core can be moved into any of multiple positions. The multi-positions of the movable core comprise the CLOSED, OPEN, BEGIN BYPASS, and BYPASS positions. When CLOSED, the flow of fluid is stopped between the inlet and outlet of the valve. When OPEN, fluid flows from the inlet through the core and out of the outlet of the valve. In the BEGIN BYPASS position, fluid is conducted from the inlet through the core and out of both the outlet and bypass tap hole of the valve. In the BYPASS position fluid is conducted from the inlet and out of the bypass tap hole of the valve.

To achieve the CLOSED position, the movable core is positioned so that a solid portion of the core is aligned with the inlet to block the fluid flow from that inlet into the core. In the OPEN position, the bypass flow opening of the movable core is aligned with an inlet, the second through opening of the core is aligned with an outlet, and the bypass tap hole is aligned with a solid portion of the core so fluid is directed from that inlet to that outlet and none is bypassed out the bypass hole. In the BEGIN BYPASS position, the movable core is positioned so that the bypass flow opening is in communication with the bypass tap hole, the second through opening of the core is in communication with an outlet, and the first through opening is in communication with an inlet thereby allowing fluid to flow from that inlet, out of that outlet and simultaneously out of the bypass tap hole. In the BYPASS position, the movable core is positioned so that the bypass flow opening of the core is aligned with the bypass tap hole, the first through opening of the core is aligned with an inlet, and the outlet is aligned with a solid portion of the core thereby directing fluid flow from that inlet out of the bypass hole.

The method of directing the flow of fluid uses the valve which has at least one inlet; at least one outlet; a bypass tap hole; and a movable core with a solid portion, first and second through openings, and a bypass flow opening; and moving the core within the valve so that a variety of positions are obtained to direct the flow of fluid. One position to direct the flow of fluid includes blocking an inlet with a solid portion of the core thereby stopping the flow of fluid through the valve. Another position is aligning the bypass flow opening of the core with an inlet and aligning the second through opening with an outlet thereby conducting the flow of fluid from the inlet to the outlet. Another position is communicating the bypass flow opening with the bypass tap hole, communicating the second through opening with an outlet, and communicating the first through opening with an inlet to direct fluid from that inlet to both the outlet and bypass hole. The flow of fluid is directed from an inlet to the bypass tap hole by aligning the first through opening with an inlet, and aligning the bypass flow opening with the bypass tap hole.

The core body is preferably cylindrical and disposed orthogonal to the valve body. The valve body is preferably comprised of a compound of malleable iron and/or steel. The core body is preferably made of brass.

A primary object of the present invention is to easily and efficiently bypass the flow of gas from one pipeline to another;

A primary advantage of the present invention is that a repairperson need not carry an external gas supply to service sites to bypass meter loops;

Another advantage of the present invention is that a repairperson will not run out of gas while servicing a gas line;

Yet another advantage of the present invention is that a repairperson need not carry hot change cylinders or hose reels to the service site;

Still another advantage of the present invention is that there is always a supply source to the bypass loop and meters can be serviced or changed without downstream loss;

And yet another advantage of the present invention is that the core design prevents plumbers and customers from using the bypass connection;

And yet still another advantage of the present invention is that the design increases safety and convenience, and saves time and money in servicing and maintaining gas measuring equipment;

Another advantage is that the bypass tap hole can be used as a lubricating port for the core.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED
EMBODIMENTS (BEST MODES FOR
CARRYING OUT THE INVENTION)

Figure 1:
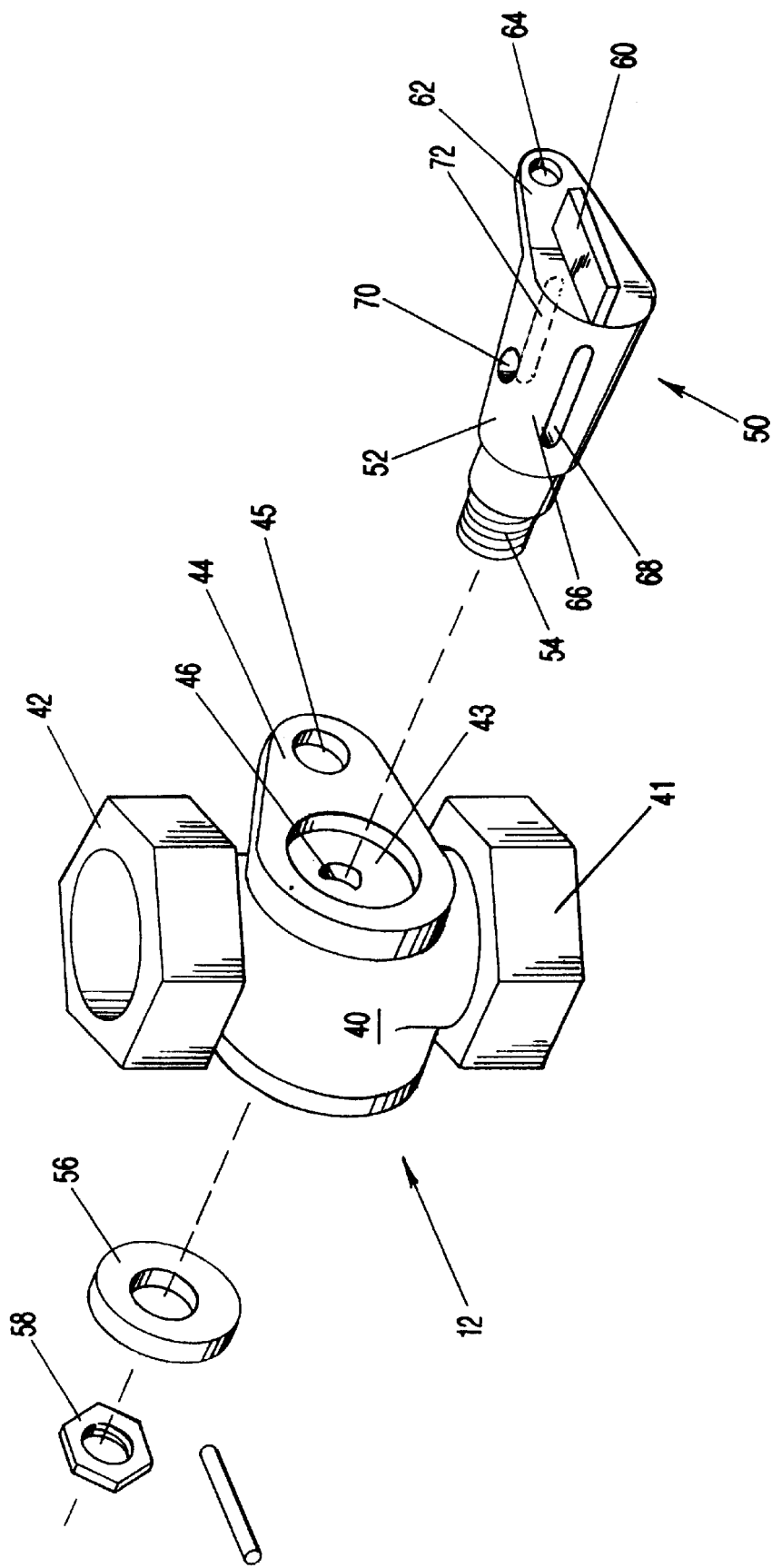
FIG. 1 shows an exploded perspective view of the preferred embodiment of the invention.
Figure 2:
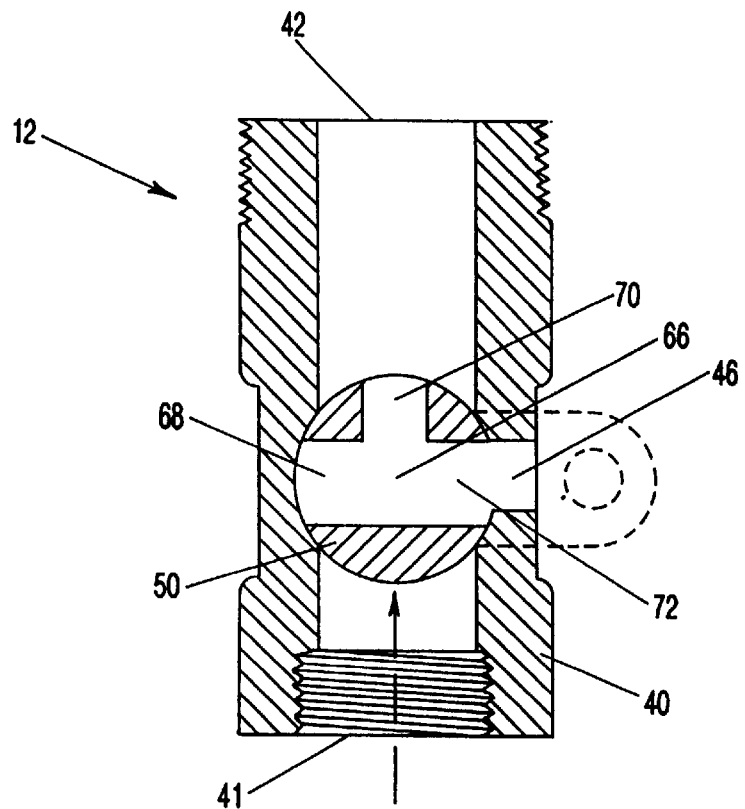
FIG. 2 shows a cross-sectional side view of the preferred embodiment of the invention in the CLOSED position.

Reference may be had to FIG. 1 where it is shown that flow valve 12 is improved in accordance with the invention so that bypass may be performed from flow valve 12 directly to customer line 16 (see FIGS. 6–8) without interruption of service. Flow valve 12 has body 40 with inlet 41 attached to supply line 10 and outlet 42 attached to customer line 16 connecting flow valve 12 to the meter 14 loop. Gas flows through flow valve 12 from inlet 41 through cavity 43 within flow valve body 40 to outlet port 42. Within cavity 43 there is provided a core shown generally at 50 including core body 52 generally cylindrical in shape and insertable into cavity 43. While FIG. 1 shows flow valve 12 in the CLOSED position, flow valve 12 would normally be in the OPEN position when installed and in operation at a customer site thereby allowing gas to flow downstream.

In the preferred embodiment one end of core body 52 has threaded section 54, which passes through cavity 43 when inserted and accepts a back plate seal or washer 56 and tightening nut 58 that may be then threaded onto end 54 to provide a seal. At the opposite end, the core has rectangular tab 60 as well as core ear 62 having hole 64. Valve body 40 has valve ear 44 integral with body 40 having hole 45. When core 50 is inserted into body 40, ear 62 may be aligned with ear 44 so that hole 45 and hole 64 are matched, permitting the bale of a padlock to be inserted through the openings thereby locking the flow valve in a CLOSED position.

Core body 52 includes passage 66 so, as will be explained, when in one position, gas from the supply line may pass to the meter loop through passage 66 (see FIGS. 2–5). Passage 66 is comprised of first through opening 70 and second through opening 72 separated by 90 degrees in core body 52. In accordance with the invention, core body 52 is provided with core bypass flow opening 68 which is located 180 degrees directly across from second through opening 72 of passage 66 of core 50. Tapped bypass hole 46 is formed in body 40 of flow valve 12. When in the FULL BYPASS position, core bypass flow opening 68 is aligned with bypass tap hole 46 so that gas from supply 10 may pass through inlet 41 into first through opening 70 and from there through core bypass flow opening 68 and through bypass tap hole 46.

In the CLOSED position, tab 60 is turned, manually or with the use of a wrench, into the horizontal position so that hole 64 of core ear 62 and hole 45 of flow valve ear 44 are aligned (see FIG. 1). Operation of the flow valve is shown in FIGS. 2 through 5. It can be seen from FIG. 2 that in the OFF position, first through opening 70, second through opening 72, and core bypass flow opening 68 are not aligned with inlet 41 and thus gas fills inlet 41, but is stopped at core 50 and no gas flows through.

Figure 3:
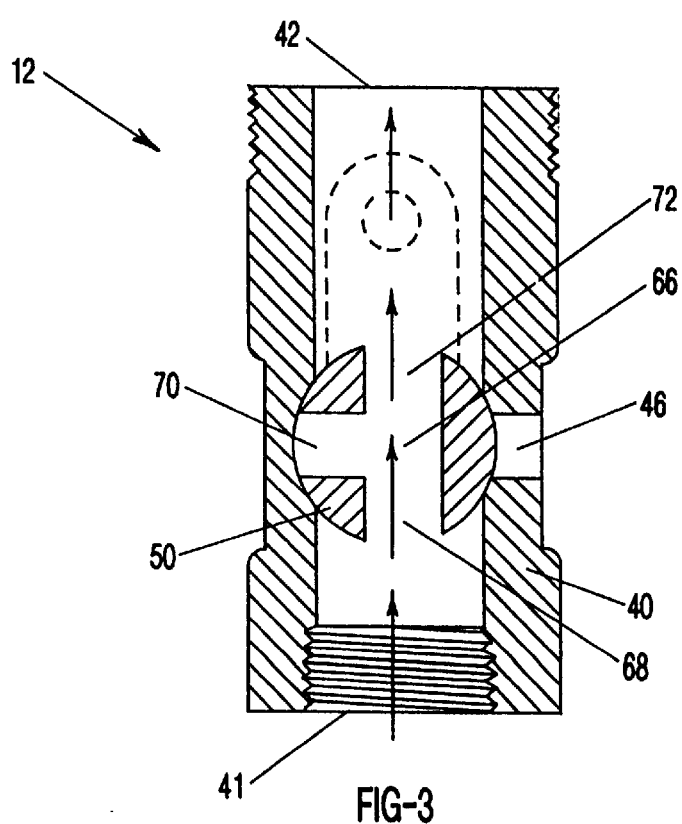
FIG. 3 shows a cross-sectional side view of the preferred embodiment of the invention in the OPEN position.

Referring now to FIG. 3, flow valve 12 is shown in the OPEN position as when service is being provided to a customer. In such event, core 50 is rotated so that tab 62 is generally in a vertical position as is ear 60 (see FIG. 1). Gas flows from inlet 41 through core bypass flow opening 68 of core 50 and out of second through opening 72 of core 50 to outlet 42 to the meter loop. In this position gas will pass directly through the core.

Figure 4:
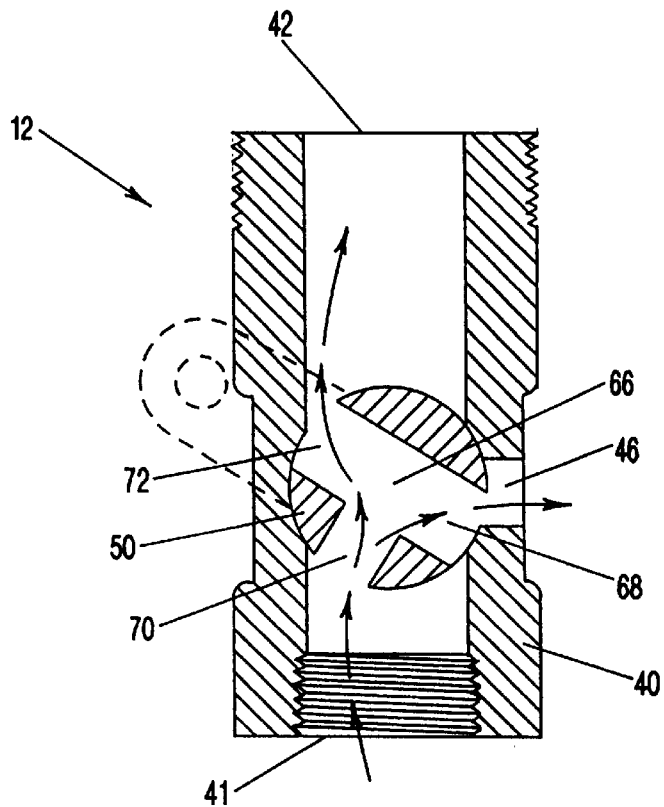
FIG. 4 shows a cross-sectional side view of the preferred embodiment of the invention of in the BEGIN BYPASS position.

When it is desired to perform repair operations on the meter loop, with the use of the present invention, it is unnecessary to have some external source of gas to perform a bypass operation. Referring to FIG. 4, the bypass operation is commenced by a partial rotation of core 50 from the OPEN position as shown in FIG. 3, with tab 60 and ear 62 as shown in FIG. 1 in a generally 45° angle to the longitudinal axis of flow valve 12. It will be understood that this BEGIN BYPASS position is merely a transition in the manual rotation of core 50 so as to effect FULL BYPASS. In this BEGIN BYPASS position, core bypass flow opening 68 in core 50 is in partial communication with bypass tap hole 46 in body 40 of flow valve 12. Second through opening 72 of core 50 is also in partial communication with outlet 42. Geis is therefore passing from inlet 41 through outlet 42, as if in normal service. A portion of the gas, however, is now diverted through core bypass flow opening 68 through bypass tap hole 46 which has been connected to bypass hose 22 and in-line regulator 24, similar to those shown in FIGS. 6–8, but without the necessity of a portable gas bottle since the upstream end of hose 22 has a connector attached to bypass tap hole 46. Gas therefore communicates through opening 41, then through first through opening 70 and core bypass flow opening 68, to bypass tap hole 46 through flexible bypass hose 22 which is attached downstream of the meter loop. Gas also flows through second through opening 72 to outlet 42 and on to the meter loop. At this position air can be bled out of the system.

Figure 5:
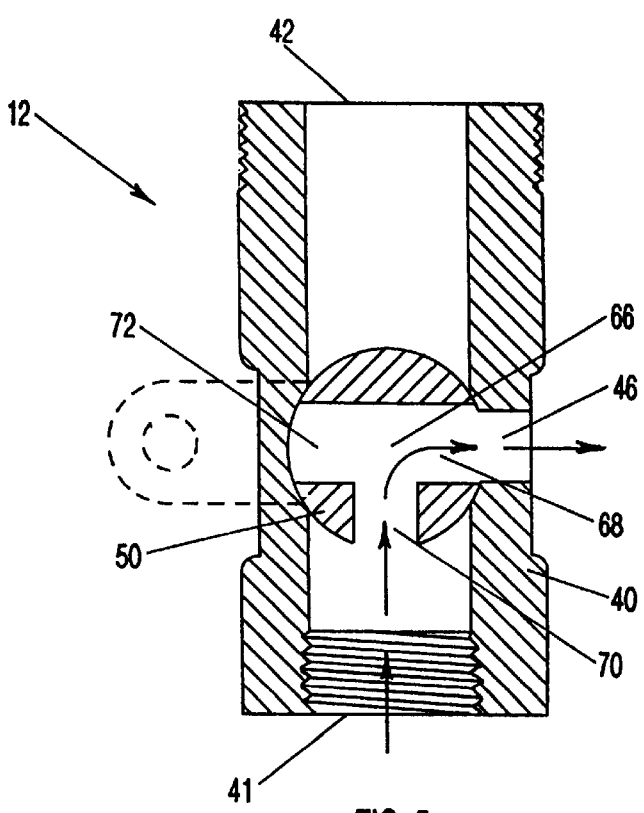
FIG. 5 Chows a cross-sectional side view of the preferred embodiment of the invention in the FULL BYPASS position.
Figure 7:
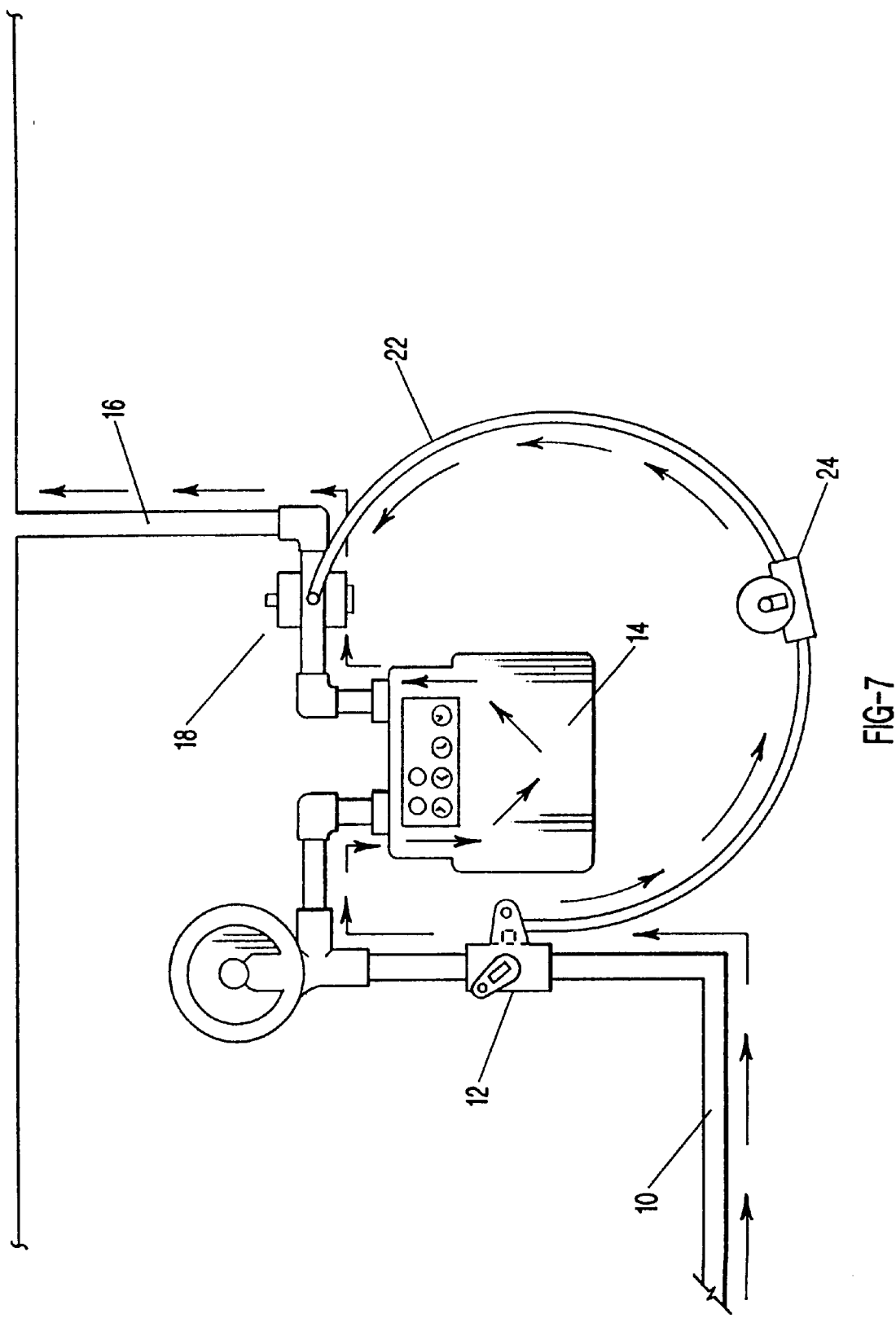
FIG. 7 shows the gas delivery system of FIG. 6 in the BEGIN BYPASS position.
Figure 8:
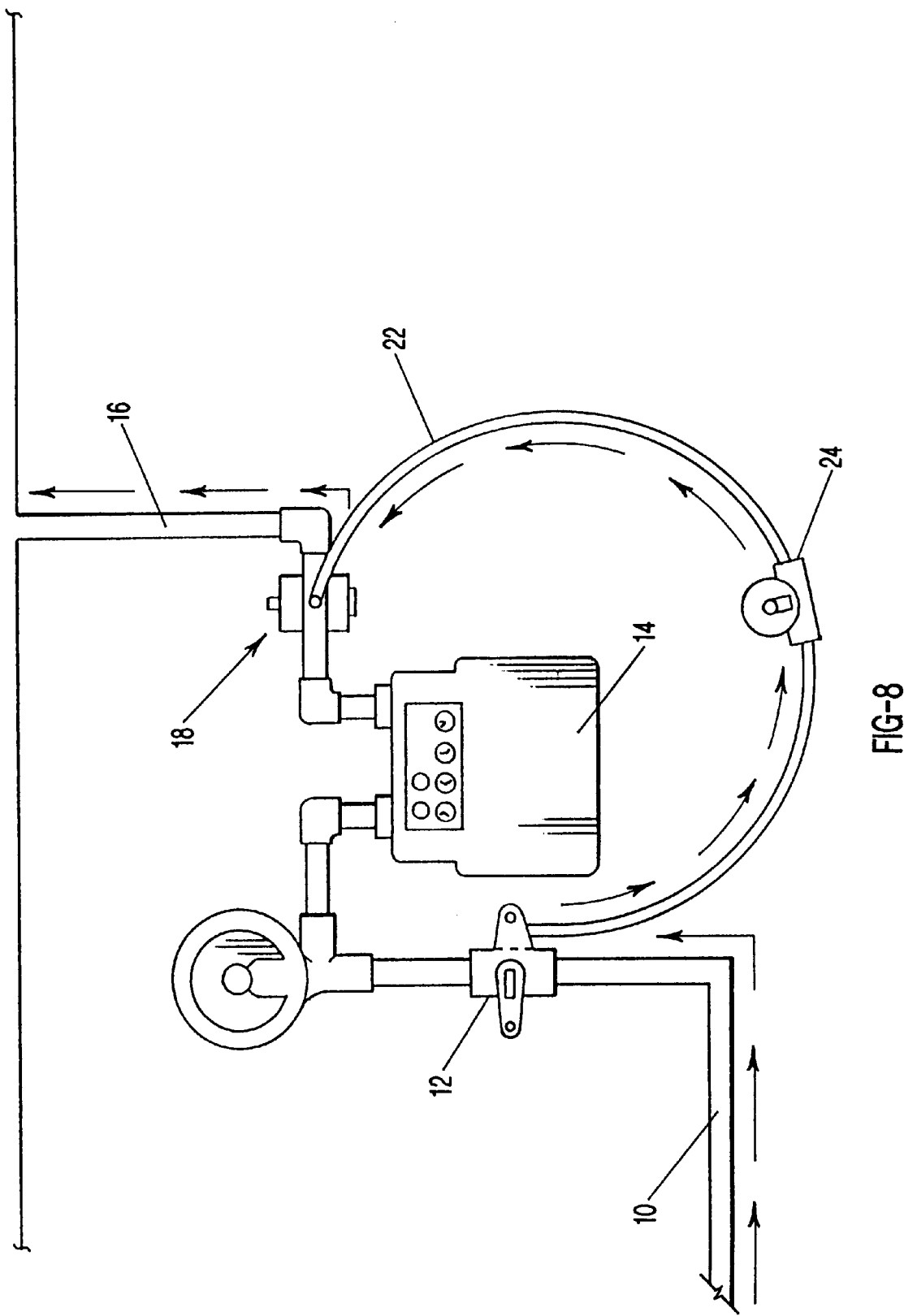
FIG. 8 shows the gas delivery system of FIG. 6 in the FULL BYPASS position.

As seen in FIG. 5, when tab 60 of FIG. 1 is again rotated fully into the horizontal position (180° from the horizontal position of tab 60 shown in FIG. 1), second through opening 72 is now positioned at a right angle to the longitudinal access of flow valve 12 so that gas may not flow from inlet 41 to outlet 42. However, in this position core bypass flow opening 68 is now aligned with bypass tap hole 46 in body 40 of flow valve 12 and gas flows freely from inlet 41 through first through opening 70 and out of core bypass flow opening 68 which is now in fluid communication with bypass tap hole 46 allowing gas to pass through flexible hose 22 and regulator 24 into customer line 16 as shown in FIG. 8. Thus, by simply rotating core 50, the repairperson can easily form a bypass from supply line 10 to customer line 16, bypassing meter 14 loop, thereby permitting repair on the meter loop through the provision of simple hose 22 and regulator 24 entirely eliminating the need for an independent gas source. (See FIGS. 6–8).

Figure 6:
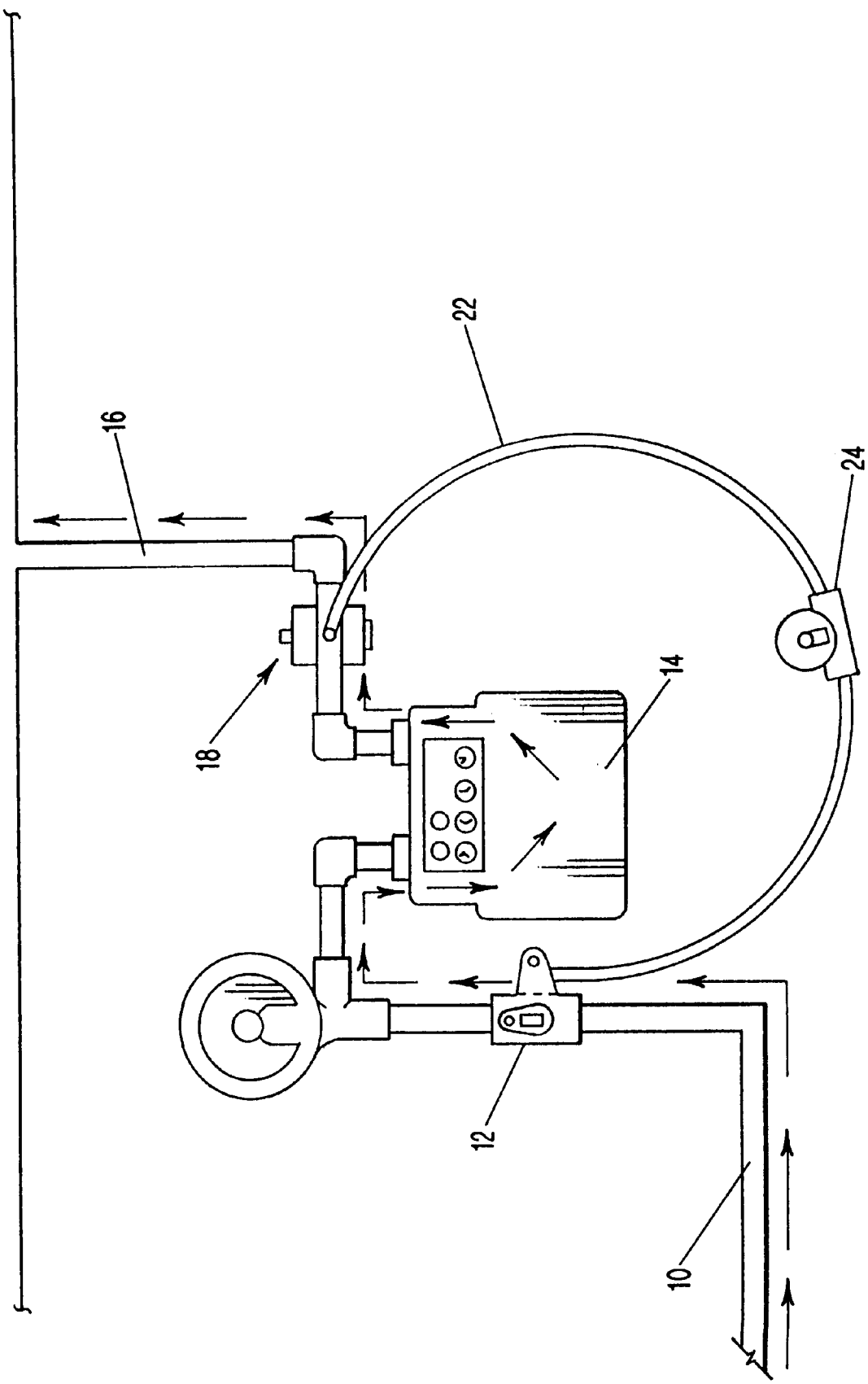
FIG. 6 shows the gas supply, flow valve, meter, and customer delivery portions of a typical gas delivery system in the OPEN position.

FIG. 6 shows the flow of gas through the meter 14 loop with arrows when flow valve 12 is in the OPEN position. FIG. 7 shows the flow of gas through the meter 14 loop and bypass hose 22 when flow valve 12 is in the BEGIN BYPASS position. FIG. 8 shows the flow of gas through bypass hose 22 when flow valve 12 is in the FULL BYPASS position.

While the operation of flow valve 12 has been discussed with respect to the flow of gas, any type of fluid could be directed with the invention.

Optionally a second flow valve is used in the system generally at 18 in place of a Grunsky Bag to bleed air from the system as the Grunsky Bag is limited in the amount of pressure it can withstand. The operation of this second flow valve is identical to that described above.

The valve body is preferably made of malleable iron or steel. The core body is preferably made of brass. The size of the flow valve is preferably from ¾ inch to 2 inches. However, many types of materials can be used to make the flow valve and it can be made any size to fit the flow system in which it is installed. Although a particular configuration and number of through openings, bypass flow openings, inlets, outlets and bypass tap holes are shown in the figures, many different configurations of those openings can be used to achieve the same or similar results and will be apparent to those skilled in the art.

INDUSTRIAL APPLICABILITY

The invention is further illustrated by the following non-limiting example.

EXAMPLE

A typical customer service configuration with a meter loop, supply line, customer service feed, bypass hose, and commonly used Grunsky Bag with a bleeder valve were used to demonstrate the operation of the invention. See FIGS. 1–8 generally. The following steps were taken:

Step 1: With flow valve 12 in the CLOSED (3:00) position, a solid underside of core body 52 was at inlet 41 and there was no flow into core 50 and no flow through flow valve 12. Although the CLOSED position was tested, flow valve 12 is normally in the OPEN position when installed and in service at a customer site to allow normal flow of gas downstream to the customer.

Step 2: By grasping tab 60 and rotating core 50 counterclockwise to the OPEN (12:00) position, gas flowed from supply line 10 into inlet 41 of flow valve 12, through openings 68 and 72, and out of outlet 42 of flow valve 12 into the meter loop. Gas did not bypass the meter loop in this position.

Step 3: While in the OPEN position, the bypass port plug was removed and there being no gas present, bypass hose 22, regulator, and Grunsky Bag was installed. The Grunsky Bag was attached to the bypass tee generally at 18. There was no gas at the bypass and no leakage.

Step 4: Next tab 60 was again grasped and rotated counterclockwise to move core 50 to the BEGIN BYPASS (10:00) position. In this position gas was ready to flow in both directions—to the meter loop as well as down bypass hose 22.

Step 5: At this point, air was bled from the Grunsky Bag with the bleeder valve. The plug was removed from the tee inside the bag. The Grunsky probe was inserted and the gas flowed through the bypass hose to the downstream customer service line.

Step 6: To move to the FULL BYPASS (9:00) position, tab 60 was grasped and core 50 was further rotated counterclockwise. This stopped the flow to the meter loop side, or outlet, of the flow valve because a solid side of core 50 was at outlet 42. Gas flowed from opening 70 and out of opening 68 down bypass hose 22 only. At this point, any maintenance or repair could be performed on the meter loop.

Step 7: After any needed maintenance or repair was performed, core 50 was rotated clockwise back to the BEGIN BYPASS (10:00) position and gas again flowed both through the meter loop and bypass hose 22. At this point the air was bled from meter 14 using the bleeder valve on the Grunsky Bag. The probe was removed from the tee and the plug was replaced inside the Grunsky Bag in the tee fitting.

Step 8: Next core 50 was rotated clockwise to the OPEN (12:00) position and gas flowed normally through flow valve 12 and meter loop. Bypass hose 22, regulator and Grunsky Bag were removed and the bypass plug replaced.

The preceding example can be repeated with similar success by substituting the generically or specifically described operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A fluid bypass system for redirecting the flow of fluid around and through a fluid meter, said system comprising:
   a flow valve installed upstream of the fluid meter, said flow valve comprising:
      a valve body having a fluid inlet, a fluid outlet for directing flow through the fluid meter, and a bypass tap hole;
      a core movably disposed between said inlet and said outlet, said core comprising a solid portion, a passage and a plurality of openings therein;
         said core selectively moveable to a first valve position to align at least one of said plurality of openings with said inlet and said outlet to direct fluid flow via said passage from said inlet to said outlet and not allow fluid flow through said bypass tap hole;
         said core selectively moveable to a second valve position to align at least one of said plurality of openings with said inlet and said bypass tap hole in order to direct fluid flow via said passage from said inlet to said bypass tap hole and not allow fluid flow to said outlet;
   a first flexible hose comprising a first end and a regulator entry end, said first end removably connectable to said bypass tap hole with a fitting;
   a moveable in-line regulator comprising an entry and an exit for control of fluid flow, said entry removably connectable to said regulator entry end of said first flexible hose;
   a second flexible hose comprising a second end and a regulator exit end, said second end removably connectable to a point downstream of the fluid meter and said regulator exit end removably connectable to said exit of said in-line regulator;
      said in-line regulator disposed at an approximate midpoint between said flexible hoses; and
      said flexible hoses providing flow of the fluid from said bypass tap hole through said in-line regulator to the point downstream of the fluid meter when said core is in said second valve position.

2. The system of claim 1 wherein said core is further selectively moveable to a third valve position to align at least one of said plurality of openings with said inlet and said bypass tap hole and said outlet in order to direct fluid flow via said passage from said inlet partially to said bypass tap hole and partially to said outlet; and said flexible hoses directing partial flow of the fluid from said bypass tap hole through said flexible hoses and said in-line regulator to the point downstream of the fluid meter and partial flow of the fluid from said inlet to said outlet and through the fluid meter.

3. The system of claim 1 wherein said flexible hoses comprises a diameter of between approximately 0.25 inches.

4. The system of claim 1 wherein said second end of said second flexible hose is removably attachable to a Grunsky bag at the point downstream of the fluid meter for bleeding air from the system.

5. The system of claim 1 wherein said plurality of openings in said core comprise:
   a first through opening;
   a second through opening; and
   a bypass flow opening.

6. The system of claim 1 wherein said bypass tap hole further acts as a lubricating port for said core.

7. A method of controlling, on-site, the flow of fluid in a fluid meter and by-pass loop, the method comprising the steps of:
   a) providing a flow valve installed upstream of the fluid meter, the flow valve comprising;
      a valve body having a fluid inlet, a fluid outlet for directing flow through the fluid meter, an a bypass tap hole;
      a core moveably disposed between said inlet and said outlet, said core comprising a solid portion, a passage and a plurality of openings therein;
         said core selectively moveable to a first valve position to align at least one of said plurality of openings with said inlet and said outlet to direct fluid flow via said passage from said inlet to said outlet and not allow fluid flow through said bypass tap hole;
         said core selectively moveable to a second valve position to align at least one of said plurality of openings with said inlet and said bypass tap hole in order to direct fluid flow via said passage from said inlet to said bypass tap hole and not allow fluid flow to said outlet;

b) moving the core to the first valve position;
c) providing a first flexible hose comprising a first end and a regulator entry end;
d) connecting, on-site, said first end of the flexible hose to said bypass tap hole with a fitting;
e) providing a moveable in-line regulator comprising an entry and an exit for control of fluid flow;
f) connecting said regulator entry end of said first flexible hose to the in-line regulator;
g) providing a second flexible hose comprising a second end and a regulator exit end;
h) positioning the in-line regulator at an approximate midpoint between the flexible hoses;
i) connecting, on-site, said second end of the second flexible hose to a point downstream of the fluid meter;
j) connecting said regulator exit end of the second flexible hose to the exit of said in-line regulator; and
k) moving the core to the second valve position thereby providing fluid flow from the bypass tap hole through said flexible hoses and the in-line regulator to the point downstream of the fluid meter.

8. The method of claim 7 further comprising the step of:
l) moving the core to a third valve position to align at least one of the plurality of openings with the inlet and the bypass tap hole and the outlet in order to direct fluid flow via the passage from the inlet partially to the bypass tap hole and partially to the outlet, thereby directing partial flow of the fluid from the bypass tap hole through the flexible hoses and the in-line regulator to the point downstream of the fluid meter and directing partial flow of the fluid from the inlet to the outlet and through the fluid meter.

9. The method of claim 7 wherein the step of connecting the second end of the second flexible hose to a point downstream of the fluid meter comprises connecting the second end of the second flexible hose directly into a Grunsky bag at a point downstream of the fluid meter.

* * * * *